(12) United States Patent
Tubbs

(10) Patent No.: US 9,227,674 B1
(45) Date of Patent: Jan. 5, 2016

(54) OPEN TOP CONTAINER WITH REINFORCED TOP RAIL

(71) Applicant: MAC TRAILER MANUFACTURING, INC., Alliance, OH (US)

(72) Inventor: Daniel L. Tubbs, Homeworth, OH (US)

(73) Assignee: MAC TRAILER MANUFACTURING, INC., Alliance, OH (US)

( * ) Notice: Subject to any disclaimer, the term of this patent is extended or adjusted under 35 U.S.C. 154(b) by 0 days.

(21) Appl. No.: 14/484,882

(22) Filed: Sep. 12, 2014

(51) Int. Cl.
*B62D 33/02* (2006.01)
*B62D 33/023* (2006.01)

(52) U.S. Cl.
CPC .................... *B62D 33/023* (2013.01)

(58) Field of Classification Search
CPC .............. F16B 12/50; A63B 21/00065; A63B 21/023; A63B 21/0428; A63B 21/154; E04D 13/031; E04D 13/0315; E04D 13/03; E04D 13/04; E04D 3/364
USPC ................ 293/183.1, 187.12, 184.1
See application file for complete search history.

(56) References Cited

U.S. PATENT DOCUMENTS

| | | | | | |
|---|---|---|---|---|---|
| 1,803,449 | A | * | 5/1931 | Wine | B61D 9/06 105/230 |
| 3,801,993 | A | * | 4/1974 | Stalder | E04H 4/0062 52/169.7 |
| 4,254,714 | A | * | 3/1981 | Heap | B61D 7/00 105/364 |
| 4,840,127 | A | * | 6/1989 | Tomaka | B61D 17/08 105/396 |
| 5,193,310 | A | * | 3/1993 | Kiel | B60J 10/0008 49/478.1 |
| 5,230,181 | A | * | 7/1993 | Geoffrey | E06B 1/70 49/469 |
| 5,373,792 | A | * | 12/1994 | Pileggi | B61D 17/04 105/406.1 |
| 5,454,620 | A | * | 10/1995 | Hill | B60P 1/04 296/183.1 |
| 5,566,849 | A | * | 10/1996 | Goehner | B65D 9/14 220/4.33 |
| 5,664,826 | A | * | 9/1997 | Wilkens | B60P 1/00 296/186.1 |
| 5,738,479 | A | * | 4/1998 | Glen | B60P 3/42 177/136 |
| 5,860,264 | A | * | 1/1999 | Gephart | E06B 3/88 52/204.71 |
| 6,623,234 | B1 | * | 9/2003 | Herring | B60P 1/286 296/183.1 |
| 7,338,111 | B2 | * | 3/2008 | Lemmons | B62D 33/023 105/409 |
| 7,784,411 | B2 | * | 8/2010 | Forbes | B61D 9/00 105/409 |
| 7,819,464 | B2 | * | 10/2010 | Haub | B62D 33/046 296/182.1 |
| 8,342,598 | B2 | * | 1/2013 | Stanton | B62D 27/026 296/191 |
| 8,550,542 | B1 | * | 10/2013 | Booher | B62D 33/023 296/183.1 |
| 8,777,324 | B2 | * | 7/2014 | Wink | B60P 1/286 298/19 R |
| 9,085,331 | B1 | * | 7/2015 | McWilliams | B60P 1/286 |
| 2002/0084676 | A1 | * | 7/2002 | Kloepfer | B62D 33/046 296/186.1 |
| 2003/0011211 | A1 | * | 1/2003 | Booher | B21C 23/145 296/186.1 |

(Continued)

*Primary Examiner* — Kiran B Patel
(74) *Attorney, Agent, or Firm* — Sand & Sebolt

(57) ABSTRACT

An open top container for transporting loads and a rail for strengthening an upper rim of the container's peripheral wall. The rail includes a U-shaped first region including first, second, and third legs secured end-to-end; and an F-shaped second region comprising a base with first and second arms extending downwardly from the base. The base is secured end-to-end with the third leg of the first region. A first strengthening rib extends outwardly from the first region and toward the container's wall. The first rib is laterally spaced from the wall but runs parallel thereto for substantially the entire length of the rail. A second rib vertically spaced from the first rib but parallel thereto may also extend outwardly from the first region and toward the container's wall. The rail increases progressively in thickness from the first leg to the second leg, then the third leg, and finally the base.

10 Claims, 4 Drawing Sheets

(56) References Cited

U.S. PATENT DOCUMENTS

| | | | | |
|---|---|---|---|---|
| 2005/0248183 A1* | 11/2005 | Booher | B21C 23/145 | 296/186.1 |
| 2006/0237992 A1* | 10/2006 | Lemmons | B62D 33/046 | 296/186.1 |
| 2007/0101895 A1* | 5/2007 | Forbes | B61D 17/00 | 105/406.1 |
| 2007/0101896 A1* | 5/2007 | Forbes | B61D 17/00 | 105/406.1 |
| 2011/0154751 A1* | 6/2011 | Gumpert | E04D 3/34 | 52/200 |
| 2012/0186171 A1* | 7/2012 | Sondermann | E04F 19/063 | 52/179 |
| 2015/0123425 A1* | 5/2015 | Huston | B60P 3/14 | 296/183.1 |

\* cited by examiner

OPEN TOP CONTAINER WITH REINFORCED TOP RAIL

BACKGROUND OF THE INVENTION

1. Technical Field

This invention relates generally to large transport vehicles. More particularly this invention relates to open top containers that are utilized to transport loads. Specifically, this invention is directed to an open-top container that has a top rail that is reinforced by increasing the thickness of various portions of the rail and by including one or more strengthening ribs that are offset from the container's wall and are spaced laterally therefrom; and which ribs run parallel to the longitudinal axis of the rail for substantially an entire length of the rail.

2. Background Information

Open top containers are utilized in the transportation industry to hold loads that need to be moved from one location to another. The containers include a floor and at least three side walls. The fourth side wall may comprise a hinged door that is opened so that a load can be packed into the trailer's interior and then closed for transport. Alternatively, the trailer may include four side walls and the load is placed in the interior and removed therefrom via the opening defined by the top rail or rim of the trailer's side walls.

Typically, the floor is reinforced and sturdy in that it has to hold the load thereon. The top rail is also relative stiff and rigid but the trailer's side walls are less substantial and less rigid. If a load is placed into and removed from the trailer by reaching over the top rail there is a risk that the top rail will be forced downwardly. As this occurs, the side walls may buckle and become permanently dented or otherwise damaged.

There is therefore a need in the art for an improved open top trailer.

SUMMARY

An open top container for transporting loads and a rail for strengthening an upper rim of the container's peripheral wall. The rail includes a U-shaped first region including first, second, and third legs secured end-to-end; and an F-shaped second region comprising a base with first and second arms extending downwardly from the base. The base is secured end-to-end with the third leg of the first region. A first strengthening rib extends outwardly from the first region and toward the container's wall. The first rib is laterally spaced from the wall but runs parallel thereto for substantially the entire length of the rail. A second rib vertically spaced from the first rib but parallel thereto may also extend outwardly from the first region and toward the container's wall. The rail increases progressively in thickness from the first leg to the second leg, then the third leg, and finally the base.

In one aspect, the invention may provide a rail for engagement with a longitudinally extending upper rim of a wall of an open-top container; where the rail runs substantially the entire length of that upper rim; and the rail comprises:

- a generally U-shaped first region including a first leg, a second leg, and a third leg secured to each other in end-to-end relationship; and
- a generally F-shaped second region comprising a base with a first arm and second arm extending outwardly away from a first side of the base; and wherein an end of the base is secured to a third leg of the arm; said second region being adapted to receive the upper rim of the wall of the container between the first and second arms, where the second arm is substantially at an opposite end of the base from the third leg; and the first region is offset from the wall; and
- a first strengthening rib is provided on the first region, said first rib extending for substantially the entire length of the rail.

In another aspect, the invention may provide an open top container comprising:

- a floor;
- a wall extending vertically upwardly from the floor and bounding and defining a compartment adapted to carry a load therein;
- a rail provided along an upper rim of the wall, said rail running substantially an entire length of the upper rim; and wherein said rail includes a first rib that runs substantially parallel to the wall and extends for substantially an entire length of the rail.

The invention may further provide an open top container where the first rib is laterally spaced from the wall and where a second rib is provided vertically spaced from the first rib and parallel thereto; and the second rib is also laterally spaced from the wall.

BRIEF DESCRIPTION OF THE SEVERAL VIEWS OF THE DRAWINGS

A sample embodiment of the invention, illustrative of the best mode in which Applicant contemplates applying the principles, is set forth in the following description, is shown in the drawings and is particularly and distinctly pointed out and set forth in the appended claims.

Similar numbers refer to similar parts throughout the drawings.

DETAILED DESCRIPTION

Figure 1:
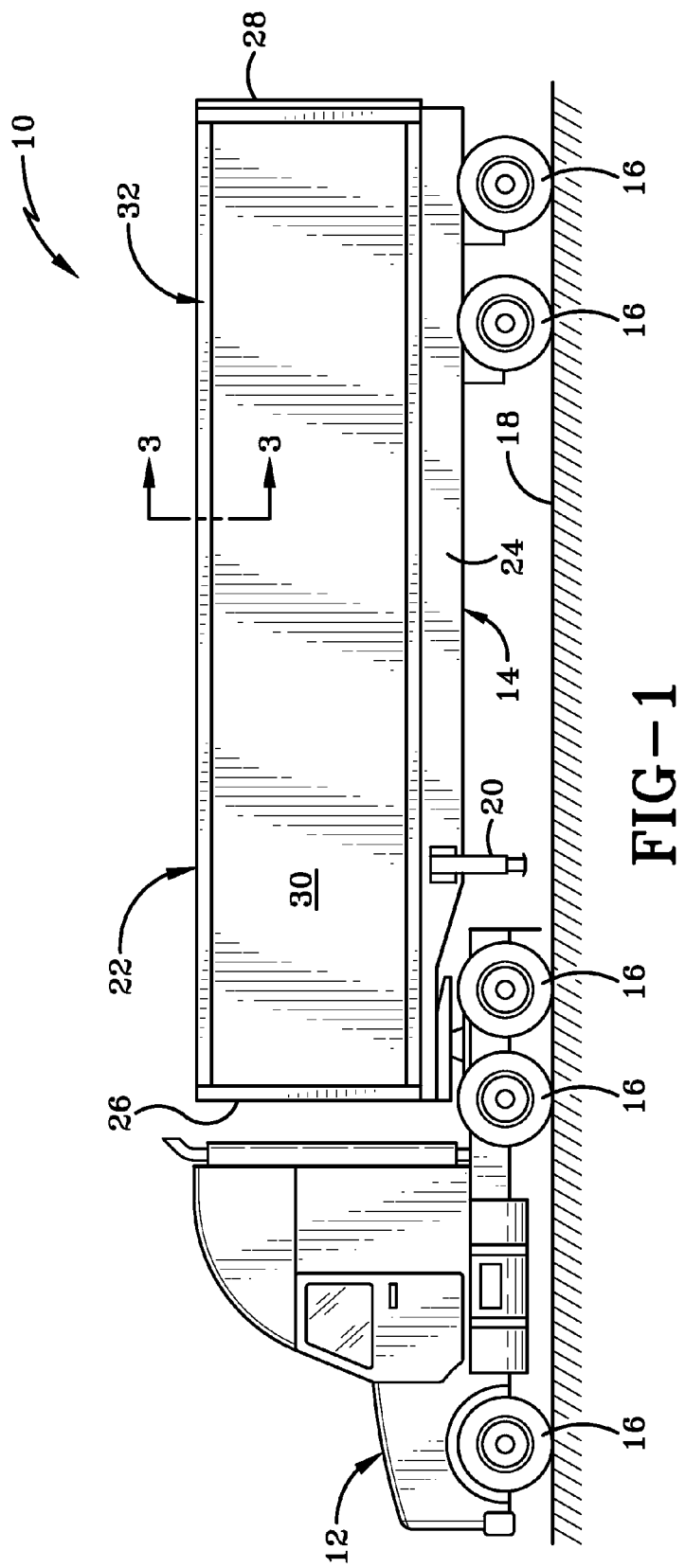
FIG. 1 is a side view of a tractor trailer which includes an open top container in accordance with an aspect of the present invention.

Referring to FIG. 1 there is shown a large transport truck 10 including a tractor 12 and trailer 14. Tractor and trailer 12, 14 include a plurality of ground-engaging wheels 16 for moving the vehicle over a road surface 18. A landing gear 20 is provided on trailer 14.

In accordance with an aspect of the present invention, truck 10 further includes an open top container in accordance with the present invention, generally indicated at 22. Container 22 may form an integral part of trailer 14 or may be separable therefrom. For the purpose of description only, container 22 as illustrated comprises an integral part of trailer 14. Container 22 includes a floor/bottom wall 24, a front wall 26, a rear wall 28, and a pair of opposed side walls 30, only one of the side walls 30 being is illustrated in the attached figures. Front wall 26, side walls 30, and rear wall 28 extend vertically upwardly from the floor/bottom wall 24. Front wall 26, side walls 30 and rear wall 28 form a peripheral wall which bounds and defines an interior compartment within container 22 and which is adapted to carry a load therein. Rear wall 28 or a portion of side wall 30 may comprise or include a door that is hingedly engaged to an adjacent region of container 22 and is pivotable between open and closed positions. When the door is pivoted to the open position, access to the interior compartment of container 22 is possible. When the door is open then the load may be placed into the compartment or removed therefrom. If no door is provided in the peripheral wall of the compartment 22, then the load is placed in the compartment and removed from the compartment over the upper rim of that peripheral wall.

Figure 2:
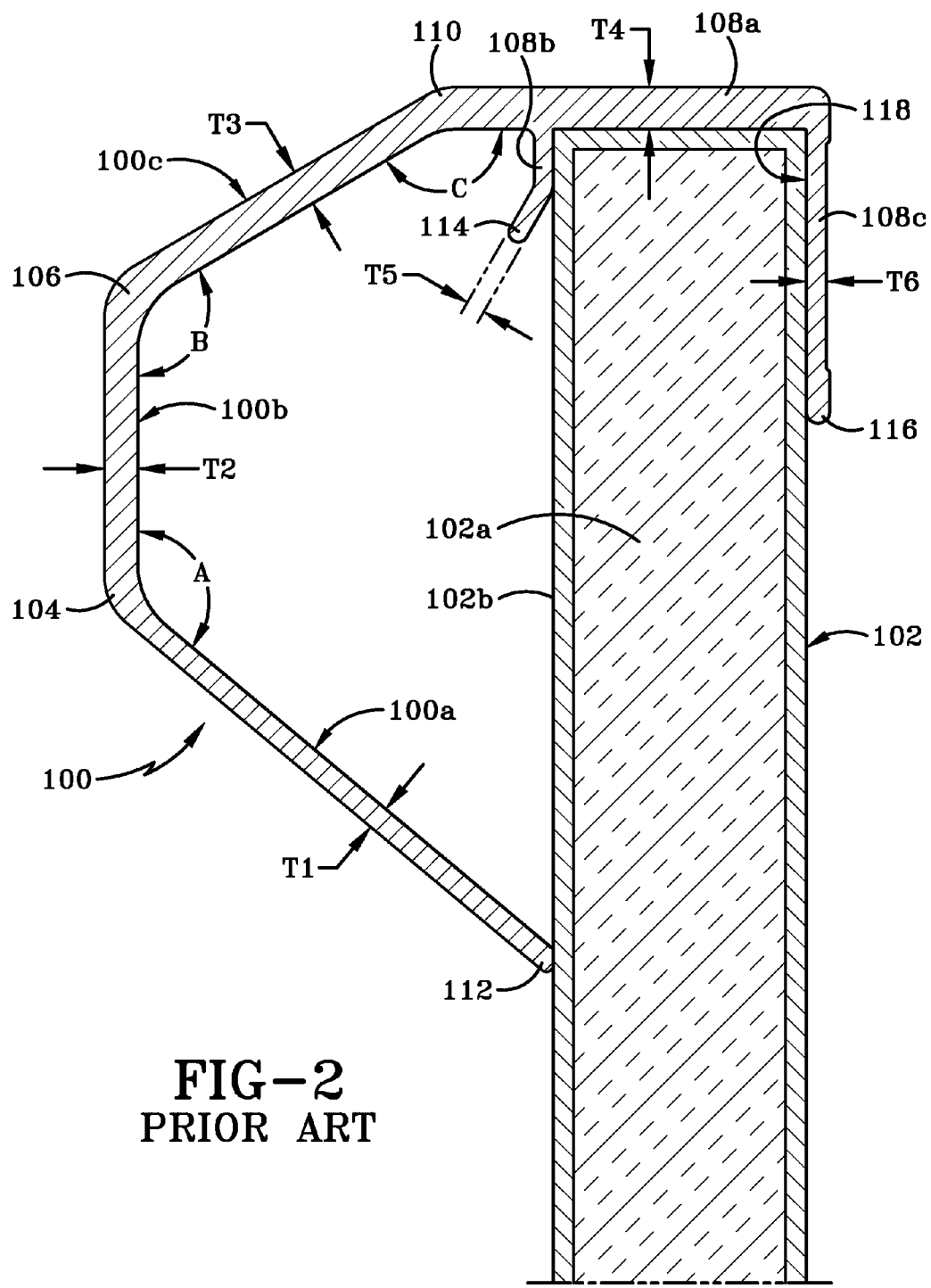
FIG. 2 is a cross-section through a top rail of a PRIOR ART open top container taken at right angles to a longitudinal axis of the rail and wall.

FIG. 2 shows a PRIOR ART top rail which is provided around an upper rim of an open top container with the PRIOR ART top rail being indicated at 100. Top rail 100 is shown engaged with a wall 102 of a PRIOR ART container. Top rail 100 includes a generally U-shaped first region which is integrally formed with a generally F-shaped second region. The U-shaped first region extends outwardly from the side wall in a direction toward the interior of the container. The first region is comprised of a first leg 100a, a second leg 100b, and a third leg 100c. First, second and third legs 100a, 100b, 100c are secured together end-to-end. First and second legs 100a, 100b meet at a corner 104 and are disposed at an angle "A" relative to each other. Second and third legs 100b, 100c meet at a corner 106 and are disposed at an angle "B" relative to each other. Each of the angles "A" and "B" are obtuse angles, i.e., greater than 90°. Angle "A" preferably is about 130° and angle "B" is about 120°.

PRIOR ART top rail 100 further includes a generally F-shaped region which comprises a base 108a and a pair of arms 108b, 108c which extend outwardly from a same side surface of base 108a. An end of base 108a is secured to an end of third leg 100c. Base 108a and third leg 100c meet at a corner 110. Base 108a is disposed at an angle "C" relative to third leg 100c. Angle "C" is an obtuse angle, i.e., greater than 90°. Angle "C" preferably is about 150°. First and second arms 108b, 108c extend outwardly from a same side of base 108a and are disposed at about 90° relative to base 108a. First and second arms 108b, 108c extend generally toward a first end 112 of first leg 100a. First arm 108b includes a rounded terminal end 114 which angles away from second arm 108b and toward second leg 100b. Preferably, terminal end 114 is disposed at an angle of about 30° relative to the rest of first arm 108b. Second arm 108c extends further outwardly from base 108a than does first arm 108b, i.e., second arm 108c is longer than first arm 108b. Second arm 108c terminates in a rounded terminal end 116. First and second arms 108b, 108c are spaced a distance laterally from each other and define a gap 118 therebetween. The top end 102a of wall 102 is received into gap 118. Angled terminal end 114 of first arm 108b makes it easier to insert top end 102a into gap 118 as the angle of end 114 guides top end 102a into gap 118. Top end 102a of wall 102 is complementary in size to gap 118 and thus the top end is wedged between first and second arms 108b, 108c. Additionally, end 112 of first leg 100a of rail 100 is adjacent the side surface of 102b of wall 102. End 112 urges side surface 102b away from the U-shaped portion of rail 100 and toward second arm 108c. The length of second arm 108c ensures that wall 102 is not forced out of gap 118.

FIG. 2 also shows that the PRIOR ART rail 100 has components of different thicknesses. First leg 100a is of a thickness "T1". Second leg 100b is of a thickness "T2", third leg 100c is of a thickness "T3", base 108a is of a thickness "T4", first arm 108b is of a thickness "T5" and second arm 108c is of a thickness "T6". Preferably, thickness "T1" is 0.2 inches; "T2" is 0.3 inches; "T3" is 0.32 inches; "T4" is 0.375 inches; "T5" is 0.150 inches; and "T6" is 0.188 inches. Thus, second leg 100b is 50% thicker than first leg 100a, third leg 100c is about 7% thicker than second leg 100b, and base 108a is 17% thicker than third leg 100c.

It should be noted that the first, second and third legs 100a, 100b, 100c, the base 108a, and first and second arms 108b, 108c run the entire length of the rail 100. So, for example, if rail 100 is provided along a side wall of the container, then all of the aforementioned legs 100a, 100b, 100c, base 108a and arms 108b, 108c extend from the front wall of the container to the rear wall thereof.

In accordance with an aspect of the present invention, a top rail 32 extends around an upper rim of container 22 to strengthen the same and provide rigidity to the structure. Top rail 32 preferably extends around the entire upper rim of container 22 including front wall 26, side walls 30 and rear wall 28.

Figure 3:
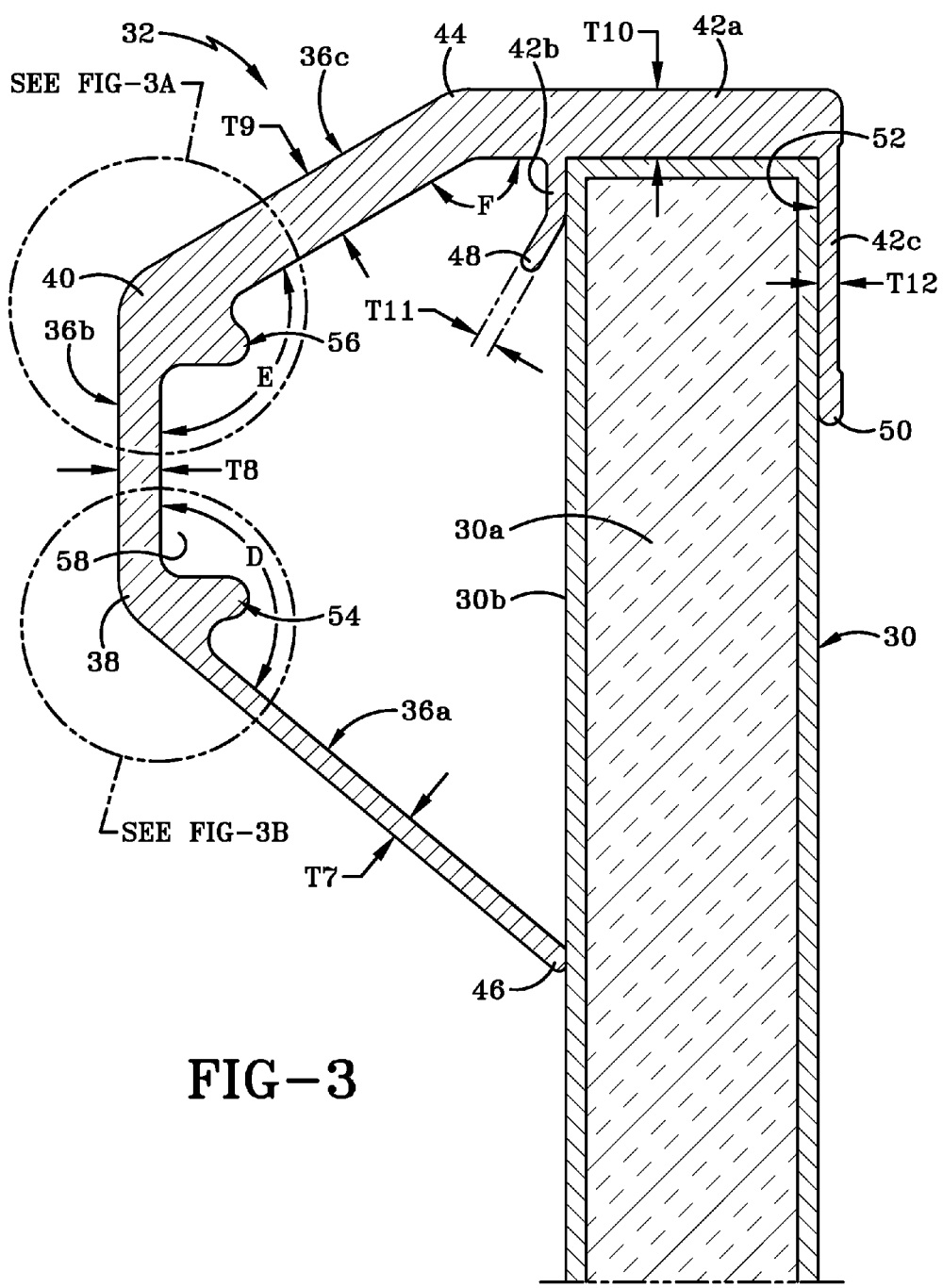
FIG. 3 is a lateral cross-section through a top rail of an open top trailer in accordance with an aspect of the present invention with the cross-section being taken along line 3-3 of FIG. 1, i.e., at right angles to a longitudinal axis of the rail and side wall.
Figure 3A:
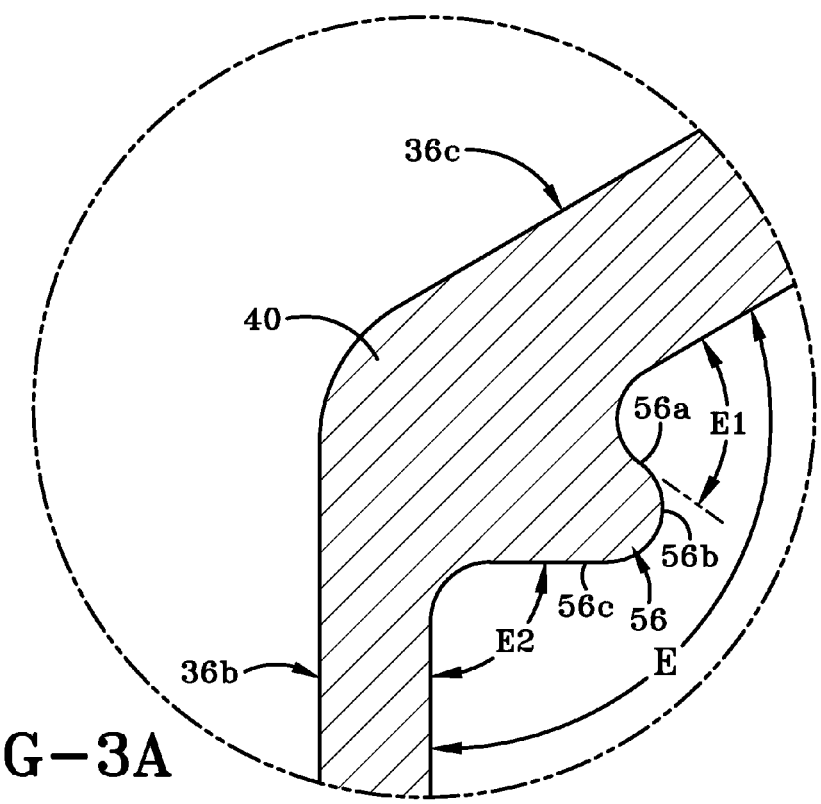
FIG. 3A is an enlarged cross-section of the first highlighted region of FIG. 3.
Figure 3B:
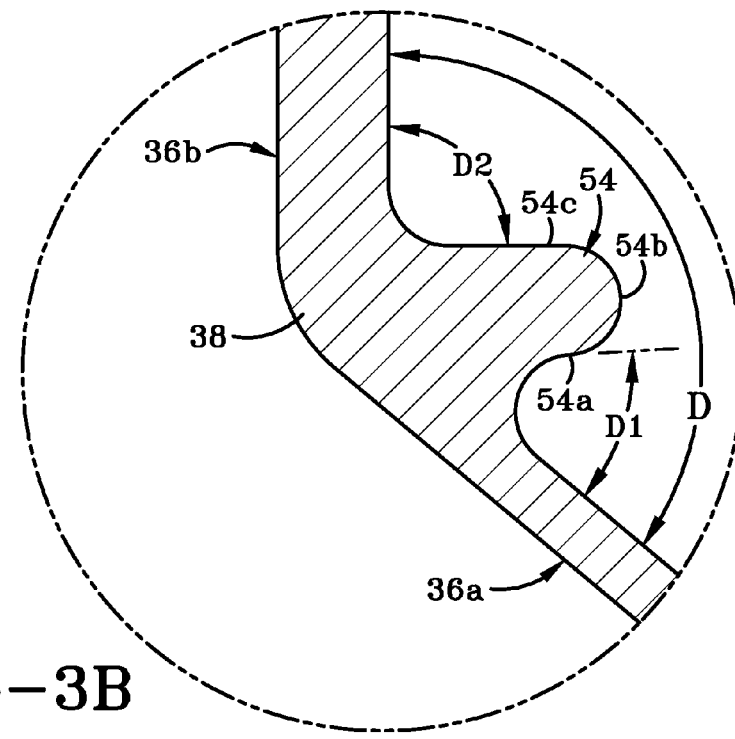
FIG. 3B is an enlarged cross-section of the second highlighted region of FIG. 3.

FIGS. 3, 3A and 3B show a top rail 32 in cross-section. Top rail 32 is shown engaged with a side wall (or front or rear wall) of a container, where the side wall is indicated at 30. Top rail 32 includes a generally U-shaped first region which extends outwardly from the side wall 30 and toward the interior of the container 22. The U-shaped first region is comprised of a first leg 36a, a second leg 36b, and a third leg 36c. First, second and third legs 36a, 36b, 36c are integral with each other being secured together in end-to-end relationship. First and second legs 36a, 36b meet at an intersection, i.e., corner 38 and are disposed at an angle "D" relative to each other. Second and third legs 36b, 36c meet at an intersection, i.e., corner 40 and are disposed at an angle "E" relative to each other. Each of the angles "D" and "E" are obtuse angles, i.e., greater than 90°. Angle "D" preferably is about 130° and angle "E" is about 120°.

The top rail 32 further includes a generally F-shaped second region which comprises a base 42a and a pair of arms 42b, 42c which extend outwardly from a same side surface of base 42a. Base 42a is integral with third leg 36c and is secured thereto in end-to-end relationship. Base 42a meets third leg 36c at a corner 44 and is disposed at an angle "F" relative to third leg 36c. Angle "F" is an obtuse angle, i.e., greater than 90°. Preferably, angle "F" is about 150°.

While the F-shaped second region is engaged with the container's wall 30, as will be hereinafter described, the U-shaped first region is offset from wall 30. First and second arms 42b, 42c extend outwardly from base 42a and are disposed at 90° relative to base 42a. First and second arms 42b, 42c extend generally toward a first end 46 of first leg 36a. First arm 42b includes a rounded terminal end 48 which angles away from second arm 42b and toward second leg 36b. Preferably, terminal end 48 is disposed at an angle of about 30° relative to the rest of first arm 42b. Second arm 42c extends further outwardly from base 42a than does first arm 42b. Second arm 42c terminates in a rounded terminal end 50. First and second arms 42b, 42c are spaced a distance laterally from each other and define a gap 52 therebetween. The top end 30a of side wall 30 is received into gap 52. Angled terminal end 48 of first arm 42b makes it easier to insert top end 30a into gap 52 as the angle of end 48 guides top end 30a into gap 52. Top end 30a of side wall 30 is complementary in size to gap 52 and thus the top end 30a is wedged between first and second arms 42b, 42c. Additionally, end 46 of first leg 36a of rail contacts the side 30b of side wall 30, and urges the same away from the U-shaped portion of rail 32 and toward second arm 42c. The length of second arm 42c ensures that side wall 30 is not forced out of gap 52.

The first, second and third legs 36a, 36b, 36c, the base 42a and first and second arms 42b, 42c run the entire length of the rail 36. So, for example, if rail 36 is provided along a side wall of the container, then all of the aforementioned legs 36a, 36b, 36c, base 42a and arms 42b, 42c extend from the front wall of the container to the rear wall thereof.

In accordance with an aspect of the present invention, a first bulbous rib 54 and a second bulbous rib 56 are provided on the U-shaped portion of rail 32. First rib 54 is provided at first corner 38 and extends inwardly from an inside surface of first corner 38 and toward second arm 42c. First rig 54 is thus laterally spaced from wall 30 and extends outwardly from the first region and toward wall 30, terminating a distance laterally away from wall 30. Similarly second rib 56 is provided at second corner 40 and extends inwardly from an inside surface of second corner 40 of the first region and toward second arm 42c. Second rib 56 is thus offset relative to wall 30 and terminates a distance laterally away from wall 30. Each of the first and second ribs 56, 58 run substantially the entire length of rail 32 and thus constitute strengthening ribs for rail 32. Ribs 56, 58 are disposed a spaced distance vertically from each other and are parallel to each other. Ribs 56, 58 are additionally substantially parallel to the plane of wall 30 of container upon which they are located. So, for example, ribs 56, 58 run substantially parallel to surface 30b of side wall 30. If rail 32 is part of front wall 26, then ribs 56, 58 in that part of rail 32 will run substantially parallel to the plane of front wall 26.

First rib has a first side surface 54a, a tip 54b and a second side surface 54c. First side surface 54a is disposed at an acute angle "D1" (FIG. 3B) relative to first leg 36a, i.e., at less than 90° relative thereto. Second side surface 54b is disposed at an angle "D2" relative to second leg 36b. Preferably, angle "D2" is about 90°. Tip 54b between first and second side surfaces 54a, 54c preferably is rounded. Side surface 54c and side surface 56c are about 0.797 inches in length from second leg 36b. The radius of curvature between side surface 54a and first leg 36a is 0.2 and the radius of curvature between side surface 54c and second leg 36b is 0.2. The radius of curvature of tip 56b is 0.188.

Similarly, second rib 56 has a first side surface 56a, a tip 56b and a second side surface 56c. First side surface 56a is disposed at an acute angle "E1" (FIG. 3A), i.e., less than 90°, relative to third leg 36c; and second side surface 56a is disposed at an angle "E2" relative to second leg 36b. Preferably, angle "E2" is about 90°. Tip 56b is rounded. The radius of curvature between side surface 56a and third leg 36c is 0.2 and the radius of curvature between side surface 56c and second leg 36b is 0.2. The radius of curvature of tip 56b is 0.188. Tips 54b and 56b are generally vertically aligned with each other—i.e., ribs 54 and 56 extend generally toward wall 30 to the same extent (i.e., ribs 54 and 56 are of the same width as measured outwardly from second leg 36b and toward wall 30.)

A gap 58 is defined between side surface 54c and side surface 56c. The length of second leg 36b between side surface 54c and side surface 56c preferably is about 1.513 inches.

FIG. 3 also shows that the rail 32 comprises component sections which are of different thicknesses. First leg 36a is of a thickness "T7". Second leg 36b is of a thickness "T8"; third leg 36c is of a thickness "T9", base 42a is of a thickness "T10", first arm 42b is of a thickness "T11"; and second arm 42c is of a thickness "T12". Thickness "T7" is 0.2 inches; thickness "T8" is 0.375 inches; thickness "T9" is 0.625 inches; thickness "T10" is 0.625 inches; thickness "T11" is 0.15 inches; and thickness "T12" is 0.188 inches. Consequently, second leg 36b is 87.5% thicker than first leg 36a; third leg 36c is 67% thicker than second leg 36b, and base 42a is the same thickness as third leg 36b.

Furthermore, first leg 36a is the same thickness as first leg 100a of the PRIOR ART rail; second leg 36b is 25% thicker than second leg 100b of the PRIOR ART rail; third leg 36c is 95% thicker than third leg 100c of the PRIOR ART rail; and base 42a is about 67% thicker than the PRIOR ART base 108a.

Thus, not only does the rail 32 of the present invention includes one or more longitudinally extending strengthening ribs, rail 32 is also substantially thicker than the PRIOR ART rail 100. Most particularly, the third leg 36c and base 42a are substantially thicker than the third leg 100c and base 108a of the PRIOR ART rail 100. Most specifically, the third leg 36c of the present invention is almost double the thickness of the third leg 100c of the PRIOR ART rail 100 and the base 42a is two/thirds thicker than the base 108a of the PRIOR ART rail 100.

It will be understood that while a first and second rib 54, 56 have been disclosed as being provided on rail 32, only one of those ribs 54 or 56 may be provided on rail 32 and the location of the rib does not have to be in any particular location on the first region of the rail. However, locating a single rib at the intersection of second leg 36b and third leg 36c would be the preferred location for a single rib. It will further be understood that additional ribs in addition to first and second ribs 54, 56 could be provided on rail. For example, providing an additional rib at the intersection of base 42a and third leg 36c could provide additional strength and rigidity to rail 32. The ribs 54, 56 and any additional ribs are most preferably located at the angled intersections between first, second and third legs, and third leg and base 42a as the tend to resist any tendency for rotation in either a clockwise or counterclockwise direction between the adjacent legs or base of the rail. The ribs therefore aid in protecting the rail and thereby the wall against deforming when an external force is applied to any part of rail 32 during placement of a load into the container or when a load is removed therefrom.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the invention are an example and the invention is not limited to the exact details shown or described.

The invention claimed is:

1. A rail for engagement with a longitudinally extending upper rim of a wall of an open-top container; where the rail runs substantially the entire length of that upper rim; and the rail comprises:

a generally U-shaped first region including a first leg, a second leg, and a third leg secured to each other in end-to-end relationship; and a generally F-shaped second region comprising a base with a first arm and second arm extending outwardly away from a first side of the base; and wherein an end of the base is secured to a third leg of the arm; said second region being adapted to receive the upper rim of the wall of the container between the first and second arms, where the second arm is substantially at an opposite end of the base from the third leg; and the first region is offset from the wall; and a first strengthening rib is provided on the first region, said first rib extending for substantially the entire length of the rail.

2. The rail as defined in claim 1, wherein the first rib is spaced laterally from the first and second arms and runs generally parallel to the second arm.

3. The rail as defined in claim 1, wherein the first rib is positioned at a first intersection between the first leg and second leg of the first region or at a second intersection between the second leg and the third leg.

4. The rail as defined in claim 3, further comprising a second strengthening rib; said second strengthening rib being disposed a distance vertically away from the first rib and laterally from the second arm; and wherein the second rib extends for substantially the entire length of the rail.

5. The rail as defined in claim 4, wherein the second rib is located at the other of the first and second intersections relative to the first rib.

6. The rail as defined in claim 4, wherein the first and second ribs project for a distance outwardly from the first region and toward the second arm.

7. The rail as defined in claim 4, wherein the first rib is located at the first intersection and the first rib terminates at a position located vertically between a terminal end of the first arm and a terminal end of the second arm.

8. The rail as defined in claim 7, wherein the second rib is located at the second intersection and the second rib terminates at a position located vertically beneath the terminal ends of both of the first arm and the second arm.

9. The rail as defined in claim 1, wherein the second leg is 87.5% thicker than the first leg; the third leg is 67% thicker than the second leg, and the base is the substantially the same thickness as the third leg.

10. The rail as defined in claim 1, wherein the first leg has a thickness of 0.2 inches; the second leg has a thickness of 0.375 inches; the third leg has a thickness of 0.625 inches; and the base has a thickness of 0.625 inches.

\* \* \* \* \*